(12) United States Patent
Jones et al.

(10) Patent No.: US 7,507,964 B2
(45) Date of Patent: Mar. 24, 2009

(54) METHOD FOR PROVIDING COLOR IMAGES FROM A MONOCHROMATIC ELECTRO-OPTICAL DEVICE USING TWO OPTICAL CHANNELS AND SYSTEMS, APPARATUSES AND DEVICES RELATED THERETO

(75) Inventors: Peter W. J. Jones, Belmont, MA (US); Dennis W. Purcell, Medford, MA (US)

(73) Assignee: Tenebraex Corporation, Boston, MA (US)

( * ) Notice: Subject to any disclaimer, the term of this patent is extended or adjusted under 35 U.S.C. 154(b) by 0 days.

(21) Appl. No.: 11/084,389

(22) Filed: Mar. 17, 2005

(65) Prior Publication Data

US 2005/0207015 A1 Sep. 22, 2005

Related U.S. Application Data

(60) Provisional application No. 60/553,835, filed on Mar. 17, 2004.

(51) Int. Cl.
*G01J 5/00* (2006.01)
(52) U.S. Cl. ..................................... 250/330
(58) Field of Classification Search .............. 348/34, 348/33, 32; 250/330
See application file for complete search history.

(56) References Cited

U.S. PATENT DOCUMENTS

| | | | | |
|---|---|---|---|---|
| 2,971,093 | A | * | 2/1961 | Garbuny ................... 250/333 |
| 4,679,068 | A | * | 7/1987 | Lillquist et al. ............. 348/33 |
| 5,214,503 | A | * | 5/1993 | Chiu et al. ................ 348/217.1 |
| H1599 | H | * | 10/1996 | Task et al. ................... 348/33 |

* cited by examiner

*Primary Examiner*—Constantine Hannaher
(74) *Attorney, Agent, or Firm*—Edwards Angell Palmer & Dodge LLP; Peter F. Corless; William J. Daley, Jr.

(57) ABSTRACT

An apparatus and methods for converting a monochrome night vision or other electro-optical device into one that provides a sensation of full color, including from red to blue with white and black. The method provides color images from an electro-optical device in which the image data from the electro-optical device contains brightness information of an area being viewed by the device without separate color information. Such a method includes operably coupling an optical channel system to the electro-optical device and configuring the optical channel system and arranging the optical channel system with respect to the electro-optical device so two color informational channels are provided to the viewer, whereby the two informational channels formed by said configuring and arranging of the optical channel system are such that the viewer sees a color image. Such methods and apparatuses of the present invention provides a sensation of full color image, including from red to blue with white and black, to the viewer.

35 Claims, 7 Drawing Sheets

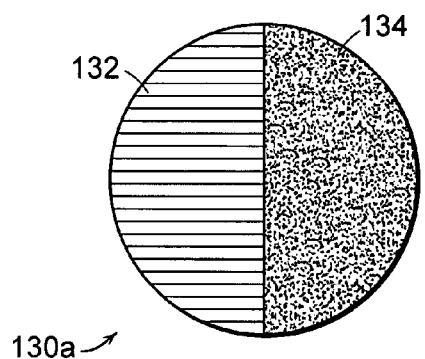
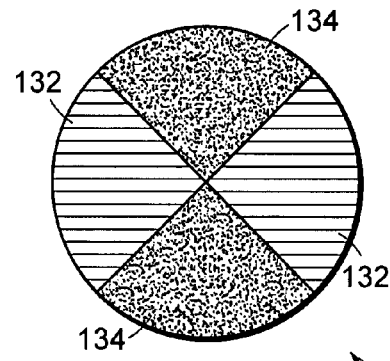
FIG. 3A  FIG. 3B
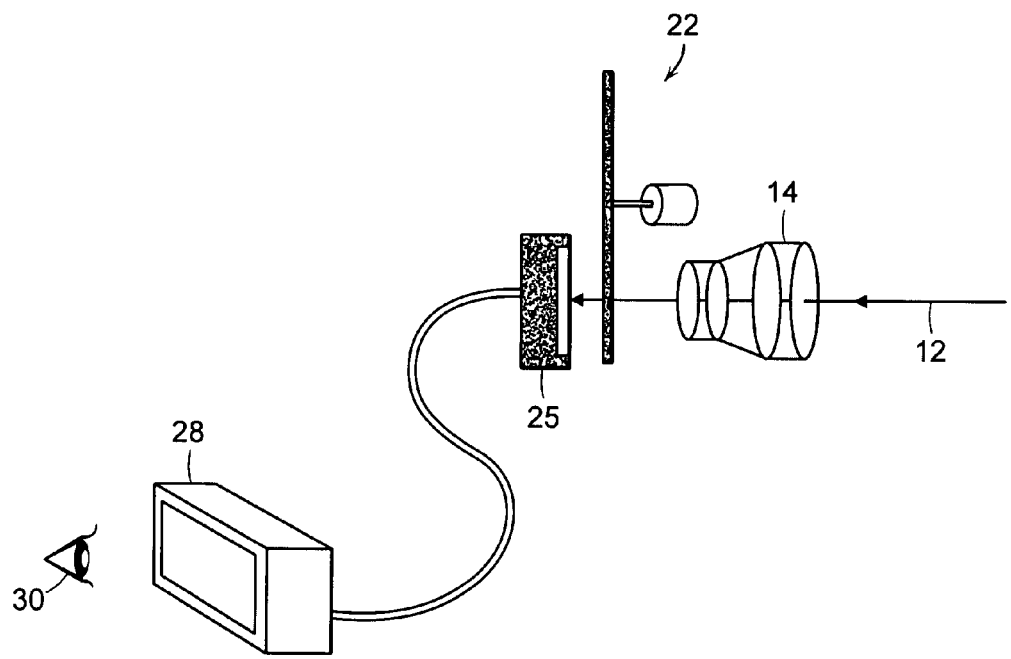
FIG. 4

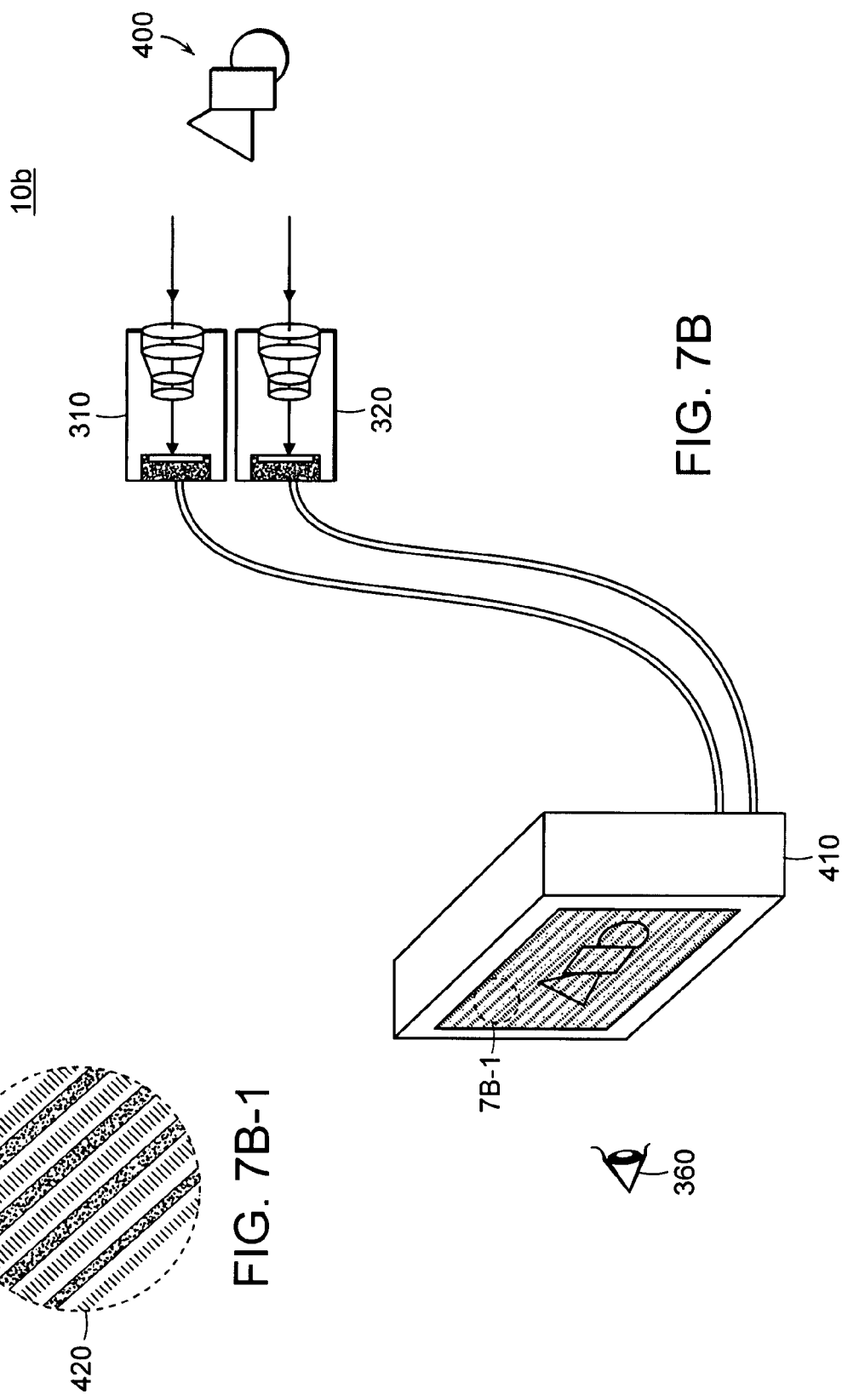

METHOD FOR PROVIDING COLOR IMAGES FROM A MONOCHROMATIC ELECTRO-OPTICAL DEVICE USING TWO OPTICAL CHANNELS AND SYSTEMS, APPARATUSES AND DEVICES RELATED THERETO

This application claims the benefit of U.S. Provisional Application Ser. No. 60/553,835 filed Mar. 17, 2004, the teaching of which are incorporated herein by reference.

FIELD OF INVENTION

The present invention relates generally to techniques and apparatus for convening a monochromatic night vision device or other electro-optical device to produce a full-color output, more particularly techniques and apparatuses that utilize a filtering system embodying two optical channels with the monochromatic night vision device or other electro-optical device to produce a full-color output.

BACKGROUND OF THE INVENTION

The vast majority of night vision devices have a monochromatic output. They typically work by using a lens to focus light from a scene onto the front of a sensor or image intensifier tube. The image is amplified and finally output on a phosphor display screen. While night vision (NV) is itself a great enhancement of normal human vision, it is sometimes desirable to have a NV device with a full-color output, for example to better differentiate an object one is searching for from its background environment.

At present, most typical methods of achieving a full-color NV device have been by the use of an especially sensitive and highly amplified CCD device (television camera). Alternatively, three separate image intensifier tubes are used that are selected or filtered so as to be sensitive to the red, green and blue portions of the spectrum. The outputs of these three tubes are then fused by the use of partially silvered prisms or mirrors or by integrating them in an interlaced red, green and blue (RGB) television-type display tube.

Among the disadvantages of these techniques are higher power usage, added weight, increased optical complexity compared to a simple image intensifier NV device, and susceptibility to being knocked out of alignment. In addition, CCD devices are not effective image intensifiers and thus limit the light amplification possible. Also many night vision devices are designed so as to be mounted on the user's head, a position where excess weight can be a problem. In addition, there is a vast installed base of monochromatic NV systems. Also, such techniques generally try and recreate the full color image by filtering light into three (3) optical channels (i.e., red, green and blue light).

There is described in International Application No. PCT/US01/05866 and U.S. Pat. No. 6,614,606, which are owned by the assignee of the present invention and whose teachings are incorporated herein by reference, methods of converting monochromatic night vision or other electro-optical viewing devices to portray a full-color image. The techniques and/or methods described therein yield night vision devices or other electrode-optical viewing devices that convert a monochromatic image so as to portray a full-color image and that avoid prior art shortcomings of higher power usage and increased optical complexity. The described methods or techniques, while advancing the art as to conversion of such monochromatic images to full color images, do not describe all particular techniques for designing filter systems or sub-systems for such use.

It thus would be desirable to provide two optical channel filtering systems or sub-systems that can provide color output from monochromatic-output electro-optical systems as well as devices; apparatuses and methods that embody such filtering systems. It would be particularly desirable to provide such filtering systems or sub-systems as well as related apparatuses, devices and methods, that would be adaptable to use any of a number of types of filters or filtering arrangements to provide the color output from the monochromatic output of electro-optical systems using a two channel filtering technique. It also would be highly desirable to provide a simple and low-cost technique whereby an apparatus; device or system embodying a monochromatic-output NV system is capable of providing a full-color output.

SUMMARY OF THE INVENTION

The present invention relates generally to techniques and apparatus for converting a monochromatic night vision device or other electro-optical device to produce a full-color output, more particularly techniques and apparatuses that utilize a filtering system embodying two optical channels with the monochromatic night vision device or other electro-optical device to produce a full-color output. The two optical channels are established so that a boundary is set between the two optical channels, where the boundary is set so as to satisfy the following relationship $580 \leq \lambda_b \leq 620$ nm, where $\lambda_b$ is the wavelength of the radiation corresponding to the boundary between the two color informational channels. In more specific embodiments, the boundary is set so as to satisfy one of the following relationships $580 \leq \lambda_b \leq 600$ nm, $590 \leq \lambda_b \leq 610$ nm or $\lambda_b$ about 600 nm (±2 nm).

The present invention features apparatus, devices, systems and methods for converting a monochrome night vision or other electro-optical device into one that provides a sensation of full color, including from red to blue with white and black using two optical channels. Preferred methods of the present invention provide such color images from an electro-optical device in which the image data from the electro-optical device contains brightness information of an area being viewed by the device without separate color information. Such methods includes operably coupling an optical channel system to the electro-optical device and configuring the optical channel system and arranging the optical channel system with respect to the electro-optical device so two color informational channels are provided to the viewer, whereby the two informational channels formed by said configuring and arranging of the optical channel system are such that the viewer sees a color image.

In further embodiments, such configuring includes configuring the optical channel system so that a boundary is set between the two color informational channels, where the boundary is in a predetermined range of values of wavelengths of radiation. In yet further embodiments, each color informational channel is characterizable by a transmission characteristic having a cutoff point, and said configuring includes configuring the optical channel system so the boundary between the two color informational channels corresponds to one of a 50% cut-off point for each respective transmission characteristic, to less than a 50% cut-off point for each respective transmission characteristic or to a 10% cut-off point for each respective transmission characteristic.

In yet further embodiments, the boundary is set so as to satisfy the one of the following relationships $580 \leq \lambda_b \leq 620$ nm, $580 \leq \lambda_b \leq 600$ nm or $590 \leq \lambda_b \leq 610$ nm, where $\lambda_b$ is the wavelength of the radiation corresponding to the boundary between the two color informational channels. In more specific embodiments, the boundary is set so $\lambda_b$ is about 600 nm (one of ±2 nm or ±6 nm).

In further embodiments the boundary is set so as to satisfy the following relationships; $\lambda_b$>580 nm, where $\lambda_b$ is the wavelength of the radiation corresponding to the boundary between the two color informational channels. In yet further embodiments the boundary is set so as to satisfy the following relationships; $\lambda_b$>590 nm, where $\lambda_b$ is the wavelength of the radiation corresponding to the boundary between the two color informational channels. Also, the boundary is further set so as to satisfy one of $\lambda_b \leq 620$ nm, $\lambda_b \leq 610$ nm or $\lambda_b \leq 600$ nm.

In further embodiments, said configuring includes configuring the optical channel system so that the boundary set between the two color informational channels is such that one of the two informational channels includes wavelengths of radiation that are generally characterized as being longer than wavelengths of radiation of the other of the two informational channels and correspondingly such that said other of the two informational channels includes wavelengths of radiation that are generally characterized as being shorter than wavelengths of radiation of said one of the two informational channels. Such an optical channel system is further configurable so as to set the boundary between the two optical channels as herein described.

In yet further embodiments, such configuring and arranging further includes configuring the optical channel system so as to include a first filtering sub-system and arranging the first filtering sub-system so as to be disposed between light coming from the area being viewed and an input end of the electro-optical device and wherein said configuring further includes configuring the first filtering sub-system so light being received at the input end of the electro-optical device is in two first color informational channels. In more particular embodiments, said configuring further includes configuring the first filtering sub-system so that a boundary is set between the two first color informational channels, where the boundary is in a predetermined range of values of wavelengths of radiation. The first filtering sub-system is further configurable so as to set the boundary between the two optical channels as herein described.

In further embodiments, such configuring and arranging further includes configuring the optical channel system so as to include an output system which is preferably a second filtering sub-system and arranging the second filtering sub-system so as to be operably coupled to an output end of the electro-optical device and so as to be viewable by an observer, and wherein said configuring further includes configuring the second filtering sub-system so light in two second color informational channels is presented to the observer. In particular embodiments, the wavelengths of light in the two second color informational channels are within the boundaries defining the two first color informational channels.

In yet further embodiments, such said configuring includes configuring the first filtering sub-system so that the boundary set between the two first color informational channels is such that one of the two first color informational channels includes wavelengths of radiation that are generally characterized as being longer than wavelengths of radiation of the other of the two first color informational channels and correspondingly such that said other of the two first color informational channels includes wavelengths of radiation that are generally characterized as being shorter than wavelengths of radiation of said one of the two first color informational channels. Also, such configuring further includes configuring the second filtering sub-system so that the two second color informational channels are such that one of the two second color informational channels includes wavelengths of radiation that are generally characterized as being longer than wavelengths of radiation of the other of the two second color informational channels and correspondingly such that said other of the two second color informational channels includes wavelengths of radiation that are generally characterized as being shorter than wavelengths of radiation of said one of the two second color informational channels.

Additionally, in another preferred embodiment, rather than directly filtering the output of the electro-optical device as described, the output can be transmitted to a display device in the absence of filtering whereby the output of the display (e.g., the wavelengths of light emitted by the display, or the light from the phosphors that comprise the display) correspond to the result produced by the above described filtered output. Thus, as referred to herein, and unless otherwise indicated, the second output system can comprise an output of a display device and such a display device can constitute a "second light filter sub-system" that can be positioned at a light-output end of an electro-optical viewing device.

In more particular embodiments, the second filtering sub-system or other output system is configured such that light from said second filtering sub-system in said one of the second color informational channels is in a narrower range than a light range of said one of the first color informational channel, and the light from said second filtering sub-system in said another of the second color informational channels is in a narrower range than a light range of said another of the first color informational channel. More particularly, the second filtering sub-system is configured such that light from said second filtering sub-system in said one of the second color informational channels is light predominantly in the range of between about 580 nm and 595 nm, and light exiting from said second filtering sub-system in said another of the second color informational channels is light predominantly in the range of between about 530 nm and 555 nm.

In yet further embodiments, methods of the present invention include adding an amount of noise in each of the two color informational channels, where the noise being added is one of random or gaussian.

Preferred apparatus of the invention comprise an electro-optical viewing device, particularly a mono-chromatic night vision device, and a light filtering system comprising two or more light filter subsystem each light filter sub-system, at least one at an input end of the night vision device and another light filtering sub-system at an output end of the night vision device. Each of the light filtering sub-systems is configured and arranged so as to filter light into two optical channels. The light filtering system of the present invention thus arranged with respect to the night vision device can provide to a viewer a sensation of full color image, including from red to blue with white and black.

In particular embodiments, each of the light filtering sub-systems is composed and/or configured so as to form two light channels, each channel having a defining characteristic (e.g., light transmission characteristic). As to the light filtering sub-system, the defining characteristics of the two light channels are established such that a cutoff point characterizing the first light channel and a cutoff point characterizing the second light channel lies within a predetermined range of wavelengths or frequencies. Because most filtering sub-system characteristics comprise sloped regions in the region of the characteristic curve that approached the cutoff points, the light filtering sub-system disposed at the input end of the night vision device is configured and arranged so the characteristic curve defining each of the light filtering sub-systems are set so that they cross each other at a point in a predetermined range of wavelengths or frequencies, whereby a region is defined by an overlapping portion of each characteristic.

In further embodiments, such an electro-optical viewing device includes a light filtering system including a first light filter sub-system positioned at a light-input end of the device and a second light filter sub-system positioned at a light-output end of the device. The first light filter sub-system is configured and arranged so as the light is filtered into two light channels, each light channel having a characteristic defining the boundaries of the light channel. Also, the first filter sub-system is configured and arranged so the characteristic for the two light channels cross each other at a predetermined point that lies in a range of predetermined values.

The second light filter subsystem is configured and arranged so as the light is filtered into two light channels, each light channel having a characteristic defining the boundaries of the light channel. More particularly, one of the light channels of the second light filter sub-system is generally characterized as including light whose wavelengths are generally longer that the light that lies within the boundaries of the second light channel. In an embodiment of the present invention, the first and second light filter sub-systems are established so that the characteristics that define each of the light channels do not overlap. In another embodiment of the present invention, the first and second light filter sub-systems are established so that the characteristics that define each of the light channels do overlap. In a more particular embodiment, the second filter sub-system is configured and arranged so the characteristic for the two light channels cross each other at a predetermined point that lies in a range of predetermined values. In more specific embodiments, the predetermined point is essentially the same as that where the light channels of the first filter sub-system cross.

In more particularly embodiments, and where each of the characteristics defining the first light filter sub-system includes a region sloping towards a cut-off of the respective light channel, the light channels are established such that the characteristics for the light channel cross each other at or about the same point with respect to the cut-off. In an exemplary embodiment, the characteristics cross each other at about a point corresponding to one of the 50% cut-off point for the respective characteristic, to less than a 50% cut-off point for each respective transmission characteristic or to a 10% cut-off point for each respective transmission characteristic.

Each of the first filtering sub-system and the second filtering sub-system are configured and arranged so as to filter light into the respective light channels using one of absorption, reflection or filtering techniques.

In more specific embodiments, the first filter sub-systems is composed, configured and/or arranged so the characteristics for the adjacent light channels cross each other at a point that lies in the range of from about 580 nm to about 620, more particularly in the range of from about 590 nm to about 610 nm and more specifically at a wavelength of about 600 nm.

In further specific embodiments, each of the first and second light filter sub-systems further include one of one or more electrically operated filter or one or more filters that are oscillated or rotated. It is within the scope of the present invention for the first light filter sub-system to comprise one type of filter and the second light filter sub-system to comprise another type of filter.

In yet further specific embodiments, excluding portions of the characteristics that are overlapping, the two light channels are characterized as including light having different wavelengths. In the case where one or both of the first and second light filtering sub-systems further include a plurality of filters that are being oscillated or rotated, and excluding portions of the characteristics that are overlapping, one of the filters is generally characterized as a long-wave pass filter and the other of the filters is characterized as a short-wave pass filter. Also, when one or both of the first and second light filtering sub-systems further includes a plurality of filters that are being oscillated or rotated, and excluding portions of the characteristics that are overlapping, one of the filters passes light have a wavelength longer than the wavelength of light at the predetermined point and the other filter passes light have a wavelength shorter than the wavelength of light at the predetermined point.

In yet further specific embodiments, the filters comprising the first and second light filter sub-systems are arranged and operated so that the general light characteristic of the filter (e.g., long wavelength light filter) of the first light filter sub-system disposed at the input end of the night vision device is the same as that for the filter of the second light filter sub-system correspondingly disposed at the output end. In other words, when a filter of the first light filter sub-system that is generally characterized as being a long wavelength filter is disposed in front of the light input end, a filter of the second light filter sub-system that is generally characterized as a long wavelength filter would be disposed an the light output end of the night vision device.

It should be recognized that the characterization of long and short wavelength filters is established based on the characteristics of the filters making up the first filter sub-system and correspondingly the filters making up the second filter sub-system. As such, it should be recognized that although the general characteristic of the filters (e.g., long or short wavelength) are the considered as being the same, the characteristic curves for each of the corresponding filters need not be the same and the wavelength cutoffs for the corresponding filters need not be the same. Also, as discussed above, it is recognized that a display device can function as and constitute a second light filter sub-system that can be positioned at a light-output end of an electro-optical viewing device.

In yet another specific embodiment, the filters comprising the first and second light filter sub-systems are arranged and operated so that the general light characteristic of the filter (e.g., long wavelength light filter) of the first light filter sub-system disposed at the input end of the night vision device is different from that for the filter of the second light filter sub-system correspondingly disposed at the output end. In other words, when a filter of the first light filter sub-system that is generally characterized as being a long wavelength filter is disposed in front of the light input end and a filter of the second light filter sub-system that is generally characterized as a short wavelength filter would be disposed an the light output end of the night vision device.

The device can comprises a night vision device or a device that has a substantially monochromatic output in the absence of the filtering system including but not limited to thermal electro-optical devices. For the present invention, the term monochromatic shall be understood to be the case where the whole image is being described by lighter and darker regions and while the image may appear as a single color, this shall be understood to mean that the output is not necessarily limited to a single wavelength.

In yet further specific embodiments, when one or both of the first and second light filtering sub-systems further includes a plurality of filters that are being rotated, the first and second filter sub-systems are rotated at a speed whereby successive switching between each of the plurality of filters comprising each filer sub-system occurs faster than about 15 times per second.

Also featured is a light vision system including an electro-optical device and a light filtering system as hereinabove described.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein:

FIGS. 3A,B are views of filter wheels according to the present invention that illustrate exemplary embodiments for such filter wheels;

FIG. 4 is a schematic view of another device according to the present invention;

FIG. 7B is a schematic view of another embodiment of the device of FIG. 7A; and

DETAILED DESCRIPTION OF THE INVENTION

Figure 1:
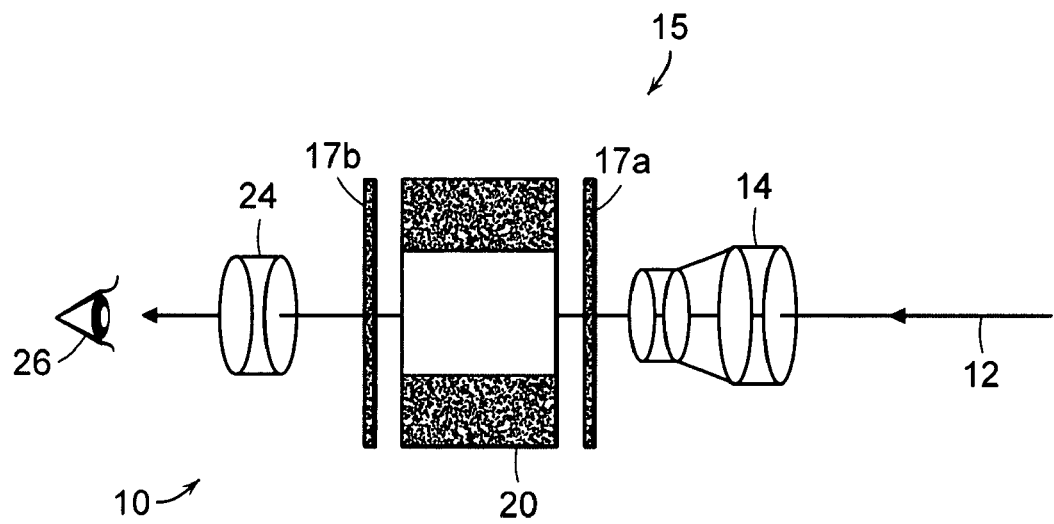
FIG. 1 is a schematic view of a color night vision device broadly illustrating the filtering system of the present invention.

The present invention features apparatus, devices, systems and methods for converting a monochrome night vision device or other electro-optical device, such as thermal night vision device into one that provides a sensation of full color, including from red to blue with white and black using two optical channels. Such electro-optical devices are generally characterized as providing image data from the electro-optical device that contains brightness information of an area being viewed by the device without separate color information. For example, a typical night vision device amplifies the available light from the area being viewed and the output of such a device provides a monochromatic display of the area being viewed.

Such methods of the present invention includes operably coupling an optical channel system or a light filtering system to the electro-optical device. The optical channel system or the light filtering system is configured and arranging with respect to the electro-optical device so two color informational channels are provided to the viewer. In this way, the brightness information for or the light from the area being viewed is effectively separated into the two color informational channels, whereby the two informational channels being formed are such that the viewer sees a color image. More particularly such methods of the present invention provides a sensation of full color to the viewer, including from red to blue with white, black and gray from the two color informational channels.

In particular embodiments, the viewing or objective lens side of the two-channel optical channel system views the scene through a filtering system that includes two filters or filtering mechanisms as herein described. These filters or filtering mechanisms divide the color information into two channels, such that one channel passes light with wavelengths that are generally shorter than a certain value and such that the other channel passes light of wavelengths that are generally longer than a certain value. The two channels of color information are then passed through the electro-optical device that amplifies or otherwise passes an image that contains only brightness information.

At the output end of the electro-optical device these two color informational channels are presented to the viewer. In preferred embodiments, the two channels being presented use two different colors, one for each channel. As herein described such output can be presented sequentially (e.g., by presenting light for one of the two channels and then presenting light for the other of the two channels). Alternatively, the output can be presented in an interleaved manner such as by using one color of phosphors in a color CRT display to render the grayscale information from the electro-optical device for one of the two channels and a second color of phosphors to render the grayscale information from the electro-optical device for the other of the two channels. In more particular embodiments, the colors of the two channels from the output end are selected so as to generally correspond to the wavelength range of the filters or filtering mechanism at the input end of the electro-optical device. For example, a shorter wavelength color would be used to render the light or grayscale information of the light passing through the filter or filtering mechanism passing short wavelength radiation to the input end of the electro-optical device and a longer wavelength color would be used to render the light or grayscale information of the light passing through the filter or filtering mechanism passing long wavelength radiation to the input end. These shall not be construed as limiting as it is within the scope of the present invention to reverse this arrangement, such as for example, when a thermal electro-optical device is being utilized to image an area.

That is, the output side of the device can present at least two channels of information of a viewer with two different wavelength bands of light. Thus, in one aspect, when the first information channel is presenting color information derived from shorter wavelength light, the ouput side of the device can present its information using shorter wavelength light. In another aspect, when the first information channel is presenting color information derived from longer wavelength light, the output side of the device can presents its information using the longer wavelength of light.

The multiple channels of information presented to a viewer through the output side of a device of the invention suitably may have a variety of specific configurations. For instance, in one configuration, the device output may comprise a shorter wavelength channel that provides light having a wavelength of 544 nm±5 nm and a longer wavelength channel that provides light having a wavelength of 622 nm±5 nm. In another configuration, the device output may comprise a shorter wavelength channel that provides light having a wavelength of 544 nm±5 nm and a longer wavelength channel that provides light having a wavelength of 670 nm±5 nm. In yet another configuration, the device output may comprise a shorter wavelength channel that provides light having a wavelength of 544 nm±5 nm and of 588 nm±5 nm and a longer wavelength channel that provides light having a wavelength of 622 nm±5 nm of 670 nm±5 nm.

In further embodiments, the provided optical channel system is configured and arranged so that a boundary is set between the two color informational channels, where the boundary is in a predetermined range of values of wavelengths of radiation. In further embodiments, particularly suited for use with any of a number of conventional night vision devices, the boundary is set so as to satisfy the one of the following relationships $580 \leq \lambda_b \leq 620$ nm, or $590 \leq \lambda_b \leq 610$ nm, where $\lambda_b$ is the wavelength of the radiation corresponding to the boundary between the two color informational channels. In more specific embodiments, the boundary is set so $\lambda_b$ is about 600 nm (±2 nm). In yet further embodiments the boundary is set so as to satisfy the following relationships; $\lambda_b > 580$ nm or $\lambda_b > 590$ nm, where $\lambda_b$ is the wavelength of the radiation corresponding to the boundary between the two color informational channels. Also, the boundary is further set so as to satisfy one of $\lambda_b \leq 620$ nm, $\lambda_b \leq 610$ nm, or $\lambda_b \leq 600$ nm.

In yet further particular embodiments, the provided optical channel system is configured and arranged so as to include a first filtering sub-system that is disposed between light coming from the area being viewed and the input end of the electro-optical device. Such a first filtering sub-system is more particularly configured so the light being received at the input end of the electro-optical device is separated into the two first color informational channels. In more particular embodiments, the first filtering sub-system is configured so that a boundary is set between the two first color informational channels, where the boundary is in a predetermined range of values of wavelengths of radiation. The first filtering sub-system is further configurable so as to set the boundary between the two optical channels as herein described.

In further embodiments, the provided optical channel system is configured so as to include a second filtering sub-system that is arranged so as to be operably coupled to an output end of the electro-optical device and so as to be viewable by an observer. In particular embodiments, the second filtering sub-system is configured so light in two second color informational channels is presented to the observer. In particular embodiments, the wavelengths of light in the two second color informational channels are within the boundaries or ranges that define each of the two first color informational channels of the first filtering sub-system.

In a particularly preferred embodiment, the second filtering subsystem is configured so that the transmission characteristics of the two second color informational channels do not cross-each other and so that there are no overlapping portions as described further herein. Alternatively, the second filtering subsystem is configured so that the transmission characteristics of the two second color informational channels cross-each other at a predetermined point, more specifically at the boundary the two first color informational channels.

In yet further embodiments, the provided first filtering sub-system is configured so that the boundary set between the two first color informational channels is such that one of the two first color informational channels includes wavelengths of radiation that are generally characterized as being longer than wavelengths of radiation of the other of the two first color informational channels and correspondingly such that said other of the two first color informational channels includes wavelengths of radiation that are generally characterized as being shorter than wavelengths of radiation of said one of the two first color informational channels. Also, the second filtering sub-system is configured so that the two second color informational channels are such that one of the two second color informational channels includes wavelengths of radiation that are generally characterized as being longer than wavelengths of radiation of the other of the two second color informational channels and correspondingly such that said other of the two second color informational channels includes wavelengths of radiation that are generally characterized as being shorter than wavelengths of radiation of said one of the two second color informational channels.

In particular embodiments, the provided second filtering sub-system is configured so light from the second filtering sub-system in said one of the second color informational channels is in a narrower range than a light range of the corresponding first color informational channel, and the light from the second filtering sub-system in said another of the second color informational channels is in a narrower range than a light range of the corresponding first color informational channel. In more particular embodiments, the second filtering sub-system is configured such that light from the second filtering sub-system in one of the second color informational channels is light predominantly in the range of between about 580 nm and 595 nm, and light exiting from the second filtering sub-system in the another of the second color informational channels is light predominantly in the range of between about 530 nm and 555 nm. Also, as discussed above, it is recognized that a display device can function as and constitute a second light filter sub-system that can be positioned at a light-output end of an electro-optical viewing device of the invention.

In yet further embodiments, each color informational channel can be characterized or defined by a curve representative of a transmission characteristic. Typically, such curves include a portion where the transmissivity of the channel decreases as a function of the wavelength of the radiation towards cut-off point corresponding to an essentially 0% transmissivity. In more particular embodiments, the optical channel system is configured so the boundary between the two color informational channels corresponds to a 50% cut-off point for the respective transmission characteristic of each of the two color informational channels. In further embodiments, the optical channel system is configured so the boundary between the two color informational channels corresponds to a less than 50% cut-off point for the respective transmission characteristic of each of the two color informational channels, or a 10% cut-off point for the respective transmission characteristic of each of the two color informational channels. This shall not be limiting as it is within the skill of those knowledgeable in the art, to select and use other points or combination of points with respect to the cut-off point for establishing the boundary to fit a particular usage and filtering sub-system/filtering mechanism.

In yet further embodiments, provided first filtering sub-system is configured so the boundary between the two first color informational channels is set so as to satisfy the one of the following relationships $580 \leq \lambda_b \leq 620$ nm, or $590 \leq \lambda_b \leq 610$ nm, where $\lambda_b$ is the wavelength of the radiation corresponding to the boundary between the two color informational channels. In more specific embodiments, the boundary is set so $\lambda_b$ is about 600 nm (±2 nm). In further embodiments the boundary is set so as to satisfy the following relationships; $\lambda_b > 580$ nm or $\lambda_b > 590$ nm, where $\lambda_b$ is the wavelength of the radiation corresponding to the boundary between the two color informational channels. Also, the boundary is further set so as to satisfy one of $\lambda_b \leq 620$ nm, $\lambda_b \leq 610$ nm or $\lambda_b \leq 600$ nm.

In further embodiments, the method of the present invention further includes adding a certain amount of noise to the image data. This noise, which is random or gaussian is added before the image data is presented to the viewer. Such noise can be in the form of random light or dark speckles in the image. The addition of noise has been found to advantageously help the brain of the viewer to decode the color information being presented and thereby presenting a rich, fully-colored image to the viewer.

Referring now to the various figures of the drawing wherein like reference characters refer to like parts, there is shown diagrammatically in FIG. 1 a color night vision system 10 embodying the methodology of the present invention including the path followed by the light (e.g., light path) in such a system. The illustrated color night vision system 10 broadly illustrates the filtering techniques of the present invention and includes an objective lens 14 as is known in the art, a filtering system 15, an image intensifier tube 20, and an eyepiece 24.

The color night vision system 10 is configured/arranged so that the entering light rays 12 pass through the objective lens 14 and then through a first filtering part 17a of the filter system 15. The light exiting the first filtering part 17a in turn passes to an image intensifier tube 20, night vision device or other electro-optical device, in which the received or inputted light is intensified therein using the technique appropriate for the device being utilized and from which a light output is provided. The light output from the image intensifier tube 20 in turn passes through the second filtering part 17b of the filtering system 15. The light passing through the second filtering part 17b typically passes through the eyepiece 24 so an observer 26 views the light exiting the eyepiece. The filtering system 15, more particularly the first and second filtering parts 17a,b, are arranged with respect to the image intensifier tube 20, as further described herein, so the observer 26 visualizes or sees a full color image while looking through the eyepiece 24.

The filtering system 15 also is configured and arranged so that each of the filtering parts 17a,b successively and alternatively filters the light between each of two band passes using any of a number of filtering techniques (e.g., absorption, reflective filtering techniques). Also, the filtering system 15, more particularly the filtering parts 17a,b thereof, are configured, arranged and controlled such that filtering by the first filtering part 17a is complemented by the filtering of the second filtering part 17b. Stated another way, the width of the band of light being filtered by the first filtering part 17a is complemented or is the same as the width of the band of light being filtered by the second filtering part 17b. As indicated herein in a preferred embodiment the band of light of the second filtering part 17b while generally corresponding to the band of light being filtered by the first filtering part, is different.

In further embodiments, each of the filtering parts 17a,b comprises two filter elements, or a plurality of two filtering elements, each filter element being any of a number of filters or filter systems known to those skilled in the art and each being characterized as one of transmitting, absorbing or reflecting light having a wavelength larger or smaller than a predetermined wavelength. Each of the first and second filtering parts 17a,b is appropriately configured, arranged and/or controlled depending upon the type of filter being used so that a filter element of the first filtering part 17a is in effect, if not actually alternatively and successively placed at the input end of the image intensifying tube 20 and so a filter element of the second filtering part 17b is in effect, if not actually alternatively and successively placed at the output end of the image intensifying tube as herein described. As indicated herein the filter elements can embody any of a number of filtering techniques or types of filter known to those skilled in the art, including electrically operated filters (e.g., LCD types of filter structures) as well as apparatus where the individual filter elements (e.g., glass filters, etc.) are rotated and/or oscillated so as to be alternatively and successively placed forward and behind the image intensifying tube 20.

The two filter elements of the first and second filtering parts in effect form or define the two color informational channels of the methodology of the present invention. Where the two filter elements of the first filtering part 17a essentially form or define the two first color informational channels and two filter elements of the second filtering part 17b essentially form or define the two second color informational channels.

Figure 2:
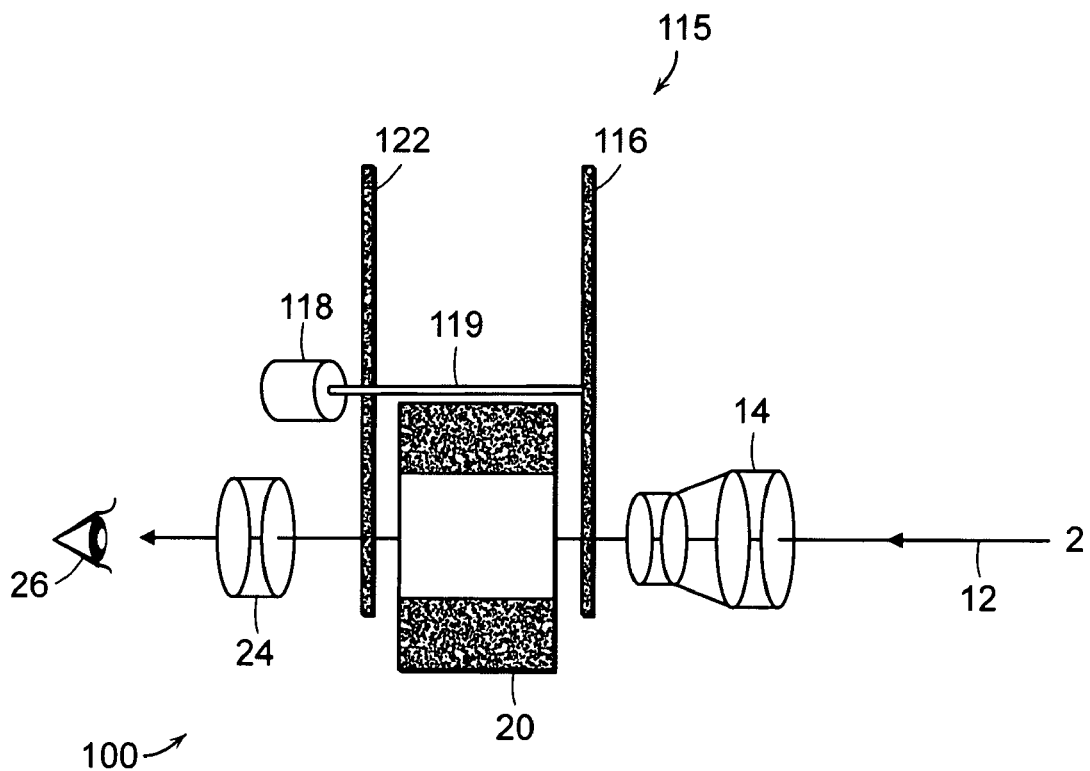
FIG. 2 is a schematic view of another color night vision device according to the present invention.

Referring now to FIG. 2, there is shown an embodiment of a color night vision system 100 according to the present invention that includes an objective lens 14, a filtering system 115, an image intensifier tube 20, and an eyepiece 24. Reference shall be made to the foregoing discussion regarding FIG. 1 for common features (e.g., features in which the reference numeral is the same). In this embodiment, the filtering system 115 comprises a first filter wheel 116 disposed generally forward of the image intensifier tube 20 and a second filter wheel that is disposed so as to be generally behind the image intensifier tube (e.g., in the optical path behind the output of image intensifier tube).

In this embodiment, the color night vision system 10 is configured and arranged so that the entering light rays 12 pass through the objective lens 14 and then through one part of the first filter wheel 116. The light exiting the one part of the first filter wheel 116 in turn passes to an image intensifier tube 20, night vision device or other electro-optical device, in which the received or inputted light is intensified therein using the technique appropriate for the device being utilized and from which a light output is provided. The light output from the image intensifier tube 20 in turn passes through a part of the second filter wheel 122. The light passing through the part of the second filter wheel 122 typically passes through an eyepiece 24 so an observer 26 views the light exiting the eyepiece. The filter wheels 116, 122 are arranged with respect to the image intensifier tube 20, as further described herein, so the observer 26 visualizes or sees a full color image while looking through the eyepiece 24.

Each of the filter wheels 116, 122 is preferably composed of two filters or filter sections, more particularly a plurality of such two filters or filter sections, that selectively filter light so that light having a predetermined bandwidth is sensed by the input of the image intensifier tube. As indicated herein, the filters or filter sections making up each of the filter wheels embody any of a number of filtering techniques known to those skilled in the art, including but not limited to absorption and reflective filtering techniques. The following discussion describes the present invention using a filtering technique in which light is being filtered so the light to be sensed and observed passes through each of the filters or filter sections. It is within the skill of those knowledgeable in the art, to adapt the below described techniques and designs so as to be useable with filters embodying other filtering techniques (e.g., filters that use reflected light).

The filter wheels 16, 22 of the color night vision system 10 further are appropriately secured to a rotating or oscillating shaft 119 or axle that is mounted generally parallel to the optical axis of the image intensifier tube 20. The axle 119 is spun or oscillated using any of a number of techniques known to those skilled in the art including manual rotation or by means of a small motor 118. More particularly, the axle 119 is spun or oscillated at a rate so that the filter sections of the filter wheels 116, 122 pass the eye faster than the eye's flicker rate (generally over 20 cycles/second) such that the different color images coming to the eye of the observer 26 fuse or merge. Stated another way, the axle 119 is spun or oscillated at a rate such that the switching between the different filter filters or filter sections is fast enough that the observer sees a merging of the different color images, producing the impression of viewing a full-color scene.

The first filter wheel 116 or filter disk is mounted to the axle 119 so that the filter sections thereof are alternatively and successively placed and passed in front or forward of the imaging sensor of the image intensifier tube 20. In the illustrated embodiment, the first filter wheel 116 is arranged so as to pass behind the objective lens 14, however, it is within the scope of the present invention for the first filter wheel to be arranged so as to pass forward of the objective lens 14. The second filter wheel 122 is affixed to the axle 119 so as to be disposed at the rear of the image intensifier tube 20 and so that when a certain section of the first filter wheel 116 is positioned in front of the optical device's sensor, a corresponding section of the second filter wheel 122 is positioned behind the output screen of the image intensifier tube. Alternatively, the second filter wheel 122 is arranged so it is disposed behind the eyepiece 24.

In this manner and when each of the filter wheels 116,122 comprises two filters or filter sections, when the first filter or filter section of the first filter wheel 116 is positioned in front of the image intensifier tube 20, the first filter or filter section of the second wheel 122 is positioned between the observer 26 and the output of the image intensifier tube 20. Likewise, when the second filter or filter section of the first filter wheel 116 is disposed in front of the image intensifier tube 20, the second filter or filter section of the second filter wheel 122 is positioned between the observer 26 and the output of the image intensifier tube.

More specifically, and with reference to the filter wheel 130a illustrated in FIG. 3A, each of the first and second filter wheels 116, 122 comprises two types of filters, i.e. a first filter 132 and second filter 134, whereby the first filter passes radiation having a wavelength than is generally shorter than the wavelength of the radiation be passed by the second filter, i.e. the first filter is a "high pass" or "short-wave pass" filter and the second filter is a "low pass" or long-wave pass" filter. Thus, as the first and second filter wheels 116, 122 are rotated, the first and second filters 132, 134 are alternatively and successively rotated through the optical path on either side of the image intensifier tube.

In another exemplary embodiment, and with reference to the filter wheel 130b illustrated in FIG. 3B, each of the first and second filter wheels 116, 122 comprise a plurality or more of the two different types of filters that are alternatively arranged around the circumference of the filter wheels. More specifically, each of the first and second filter wheels 116, 122 comprise a plurality or more of pairs of the two different types of filters 132, 134 so that each of the different types of filters are alternatively arranged around the circumference of the filter wheel. In the illustrated embodiment, the filter wheel 130b comprises two first filters 132 and two second filters 134 that are alternatively arranged about the circumference of the illustrated filter wheel.

In further embodiments, the different types of filters 132, 134 of each of the first and second filter wheels 116, 122 are composed, configured and/or arranged using any of a number of techniques known to those skilled in the art such that each are characterized by a unique characteristic (e.g., a transmission characteristic) and such that the unique characteristic for one filter 132 crosses the characteristic for the other filter 134 at a predetermined point with respect to the cut off point for each of the filters. In this way, the filtering system 115 formed by first and second filter wheels 116, 122 embodying filters that are each characterizable by a transmission characteristic, passes light through the image intensifier tube 20 in the region where the two transmission characteristics overlap each other when both of the first or second filters 132, 134 are disposed in front of and behind the image intensifier tube 20.

As discussed above, and depicted in FIG. 4, an electro-optical device 10 (such as a color night vision device or a thermal electro-optical device or sensor) of the invention can utilize a display device as a second light filter sub-system. Thus, as shown in FIG. 4, entering light 12 passes through device objective lens 14 and a first filter 22 to be received to a charge-coupled device 25 at the device output side that transmits the output to display device 28 which can provide a color display (e.g., via the wavelengths of light emitted by the display, or the light from the phosphors that comprise the display) to viewer which correspond to the result produced by the above described filtered output.

Figure 5A:
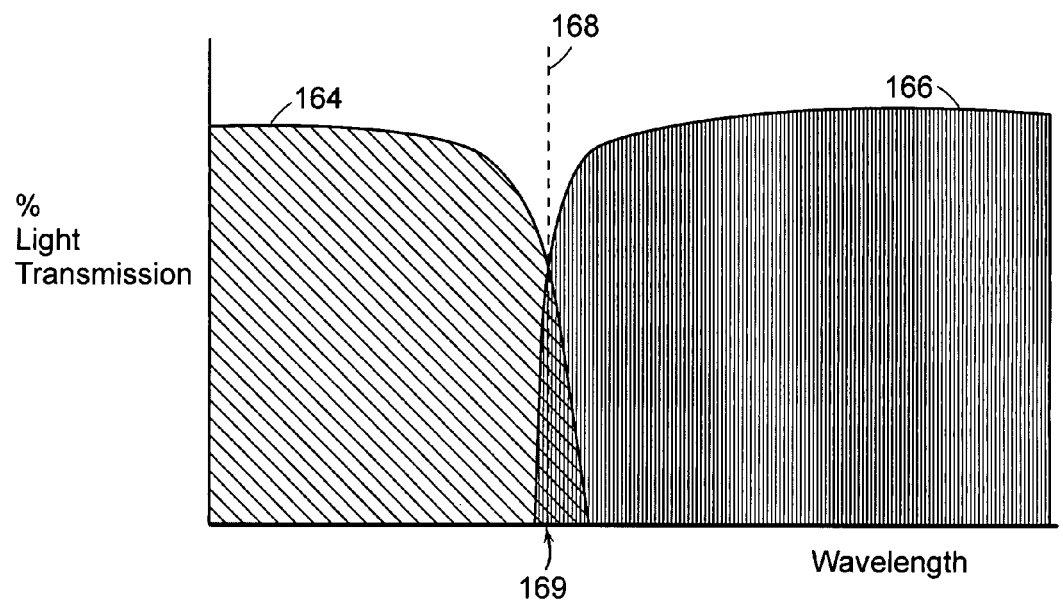
FIG. 5A is a graph illustrating the light transmission characteristic of the first filtering sub-system according to the present invention.

Referring now also to FIG. 5A there is shown an exemplary graph of the percent (%) light transmitted through each of the filters that make up the first filter wheel 116 or the first filtering part 17a versus wavelength of light. This graph illustrates the composite transmission characteristic of the filtering system 115 of the exemplary night vision system 100 when using such filters. One curve 164 illustrates an exemplary transmission characteristic of a filter that is composed, configured and/or arranged so as to be generally characterized as a long-wave pass filter. The other curve 166 illustrates an exemplary transmission characteristic for a filter that is composed, configure and/or arranged so as to be generally characterized as being a short-wave pass filter. In addition and as shown in FIG. 5A, the long-wave pass filter and the short-wave pass filter also are composed, configured and/or arranged so that falling edge of the transmission characteristic of each filter approaching the cut-off of the respective filter cross each other respectively at a point 168. Consequently, and as illustrated therein, the light have wavelengths lying in the region 169 defined or delineated by the overlapping transmission characteristics is passed to the image intensifier tube 20 by either of the filters.

In further embodiments, the long-wave pass filter and the short-wave pass filter are each configured, composed and/or arranged so that the respective transmission characteristics of each filter cross each other, namely the crossover point 168 is located so as to be in a range of wavelengths from about 580 nm to about 620 nm, more particularly in the range of from about 580 nm to about 600 nm or in the range of from about 590 nm to about 610 nm. In a more specific embodiment, the long-wave pass filter and the short-wave pass filter are each configured, composed and/or arranged so the crossover point 168 is at about 600 nm (e.g., ±2 nm).

In more particular embodiments, the long-wave pass filter and the short-wave pass filter are configured, composed and/or arranged so that the respective transmission characteristics of each filter is at about the 50% from the cut-off point of the respective filter when the transmission characteristics of the filters cross each other. In further embodiments, the long-wave pass filter and the short-wave pass filter are configured, composed and/or arranged so that the respective transmission characteristics of each filter is at about to a less than 50% cut-off point for the respective transmission characteristic of each of the two color informational channels, or at about a 10% cut-off point for the respective transmission characteristic of each of the two color informational channels.

Figure 5B:
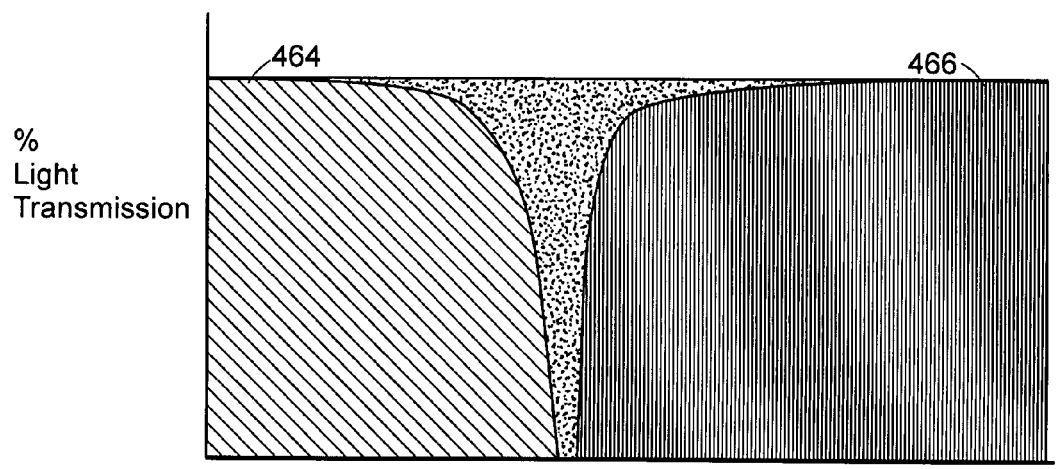
FIG. 5B is a graph illustrating the light transmission characteristic of the second filtering sub-system according to the present invention.

Referring now also to FIG. 5B there is shown an exemplary graph of the percent (%) light transmitted through each of the filters that make up the second filter wheel 122 or the second filtering part 17b versus wavelength of light. This graph further illustrates the composite transmission characteristic of the filtering system 115 of the exemplary night vision system 100 when using such filters. One curve 464 illustrates an exemplary transmission characteristic of a filter that is composed, configured and/or arranged so as to be generally characterized as a long-wave pass filter. The other curve 466 illustrates an exemplary transmission characteristic for a filter that is composed, configure and/or arranged so as to be generally characterized as being a short-wave pass filter. In addition and as shown in FIG. 5B, the long-wave pass filter and the short-wave pass filter also are composed, configured and/or arranged so that the transmission characteristic of each filter does not cross each other. In an alternative embodiment, and as illustrated in FIG. 4A, the long-wave pass filter and the short-wave pass filter also can be composed, configured and/or arranged so that the transmission characteristic of each filter does cross each other such as at the predetermined point 168 illustrated in FIG. 5A.

Figure 7A:
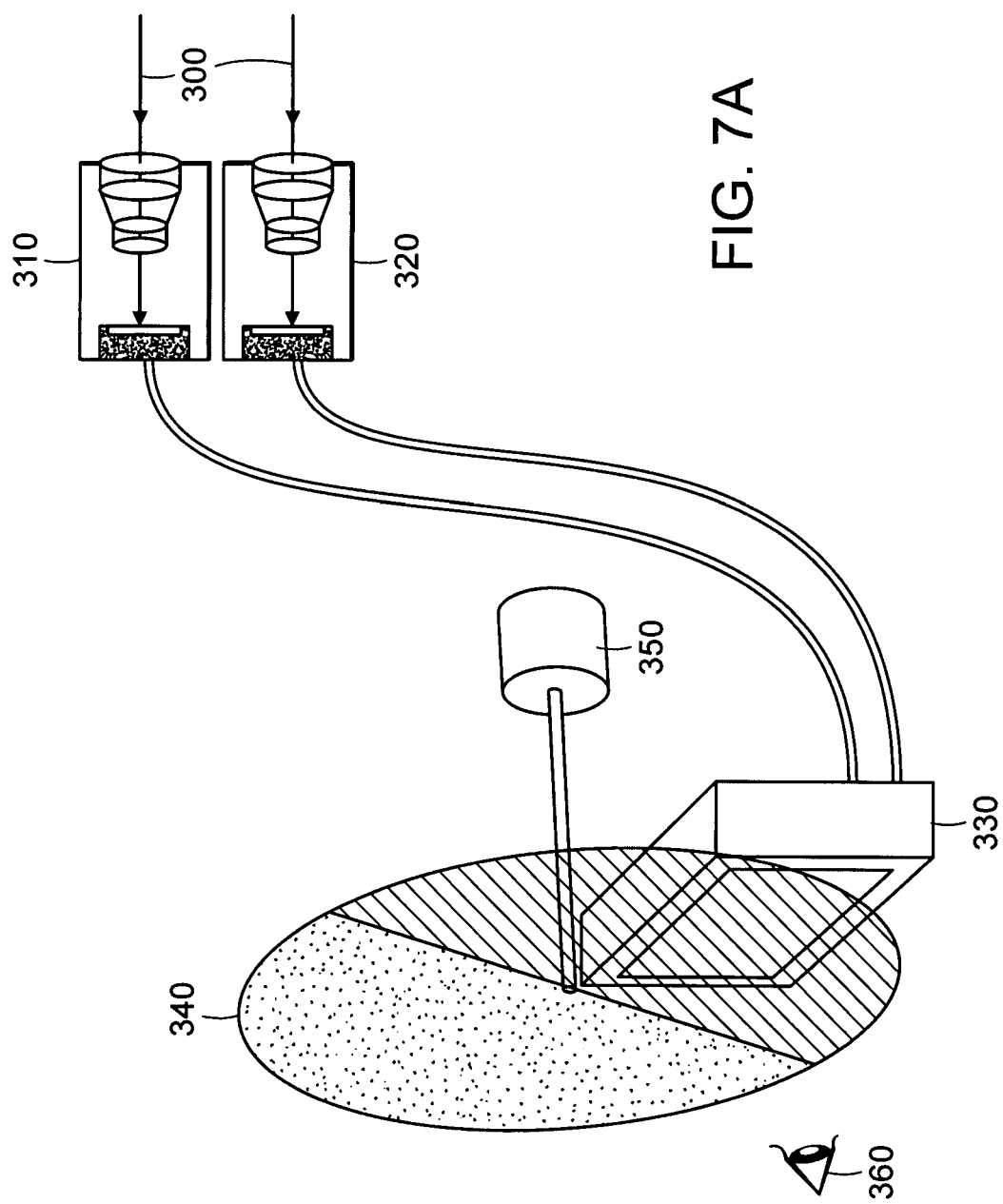
FIG. 7A is a schematic view of another color night vision according to the present invention.

As indicated above, the electro-optical device for use in the color night vision system of the present invention can be a thermal electro-optical such as for example the device being illustrated in FIG. 4. Referring now to FIG. 7A, there is a schematic view of another color night vision system 10a according to the present invention that embodies one or more thermal electro-optical devices, and in exemplary embodiments, two thermal electro-optical devices or thermal sensors where one is longer wave sensor (e.g., 8-12 microns) and the other is a shorter wave sensor (e.g., 4-6 microns). In the illustrated system, the light rays 300 from the scene being observed enter the two thermal sensors, the longer wave sensor 310 and the shorter wave sensor 320. The output from these sensors is provided to a display 330 and the images from these sensors are produced alternately on the display 330. A two segment filter wheel 340 also is provided and which is rotated by a motor 350. The filter wheel is positioned and rotated such that when the image from the longer wave sensor 310 is on the display, it is seen through one filter segment by the observer 360 and when the image from the shorter wave sensor 320 is on the display, it is seen through the other filter segment.

Referring now to FIG. 7B, there is a schematic view of a color night vision system 10b that is an embodiment of the color night vision system of FIG. 7A. This system 10b embodies one or more thermal electro-optical devices, and in exemplary embodiments, two thermal electro-optical devices or thermal sensors where one is longer wave sensor (e.g., 8-12 microns) and the other is a shorter wave sensor (e.g., 4-6 microns). In the illustrated system, the image output from both sensors 310, 320 are inputted to a two-color display 410. The image outputs are processed such that the image of a scene 400 from the longer wave sensor 310 and the image from the longer wave sensor 320 are displayed in an interleaved manner on the two-color display 410. In more particular embodiments, the two-color display is made up of two different colored interleaved phosphors, 430 and 440. In further embodiments, one phosphor is constituted so it produces a narrow wavelength band of light that is less than $\lambda_b$ (the wavelength of the radiation corresponding to the boundary between the two color informational channels) and the other phosphor is constituted so as to produce a narrow wavelength of light that is greater than $\lambda_b$.

In this way, two optical channels are established for viewing by the observer 360. As indicated herein the boundary is set so as to satisfy the following relationship $580 \leq \lambda_b \leq 620$ nm. In more specific embodiments, the boundary is set so as to satisfy one of the following relationships $580 \leq \lambda_b \leq 600$ nm, $590 \leq \lambda_b \leq 610$ nm, or $\lambda_b$ is about 600 nm (±2 nm).

Figure 7C:
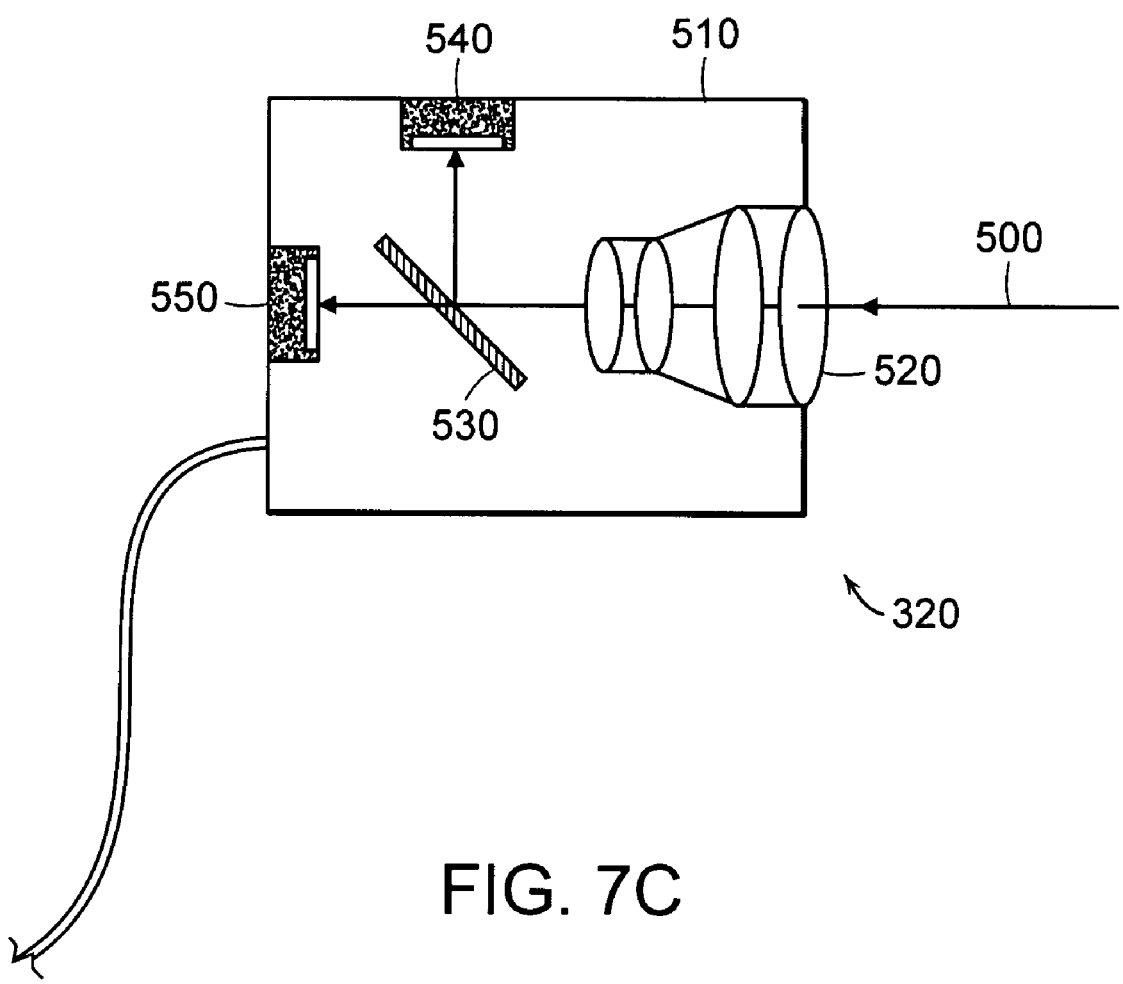
FIG. 7C is a schematic view of another color night vision device according to the present invention.

Referring now to FIG. 7C, there is a schematic view of another embodiment of a color night vision system 10c according to the present system, where the image display is omitted for clarity. Such a system 10c is configurable so as to include the mechanisms described in FIGS. 7A-B for displaying the image outputted by the thermal electro-optical device, imaging device or camera 510. In the illustrated embodiment, the imaging device or camera 510 is arranged so the longer wavelength sensor 540 and the shorter wavelength sensor 550, are disposed within the camera 510 and a beam splitters 530 is disposed in the optical path from the optics 520. In this way, the light rays 500 from the scene being observed pass through the optics 520 and the beam splitter 530 splits the light so light in one spectral range is passed to the longer wave sensor 310 and so light in another spectral range is passed to the shorter wave sensor 320. The outputs from the different sensors are outputted to the display as herein described in either of FIGS. 7A and B.

Figure 6A:
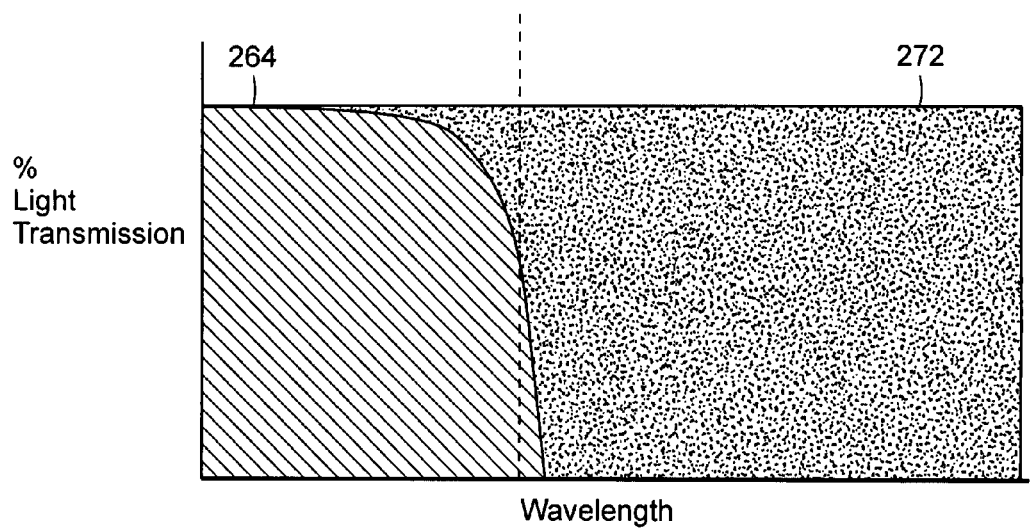
FIGS. 6A,B are graphs more particularly illustrating the transmission characteristic of reflective type of filters.
Figure 6B:
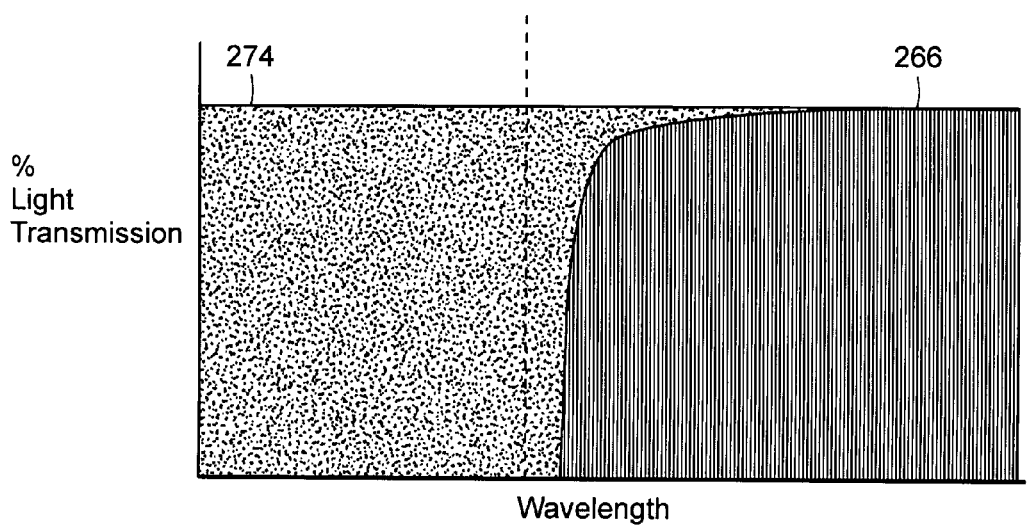

As indicated above, the color night vision system 10, 100 of either embodiment is configurable so as to use reflective filtering techniques or rejection filters. This type of filter is configured so as to work by reflecting light (i.e., not absorbing light) in a wavelength range that is not wanted and transmitting light in a wavelength range that is desired or wanted. For example, and with reference to FIG. 6A, there is shown an exemplary characteristic or curve 264 for a long-wave rejection filter that is configured so as to generally reflect light having wavelengths shorter than that delineated by the characteristic such as the light having wavelengths lying in the region 272 of the graph. Also, and with reference to FIG. 6B, there is shown an exemplary characteristic or curve 266 for a short-wave rejection filter that is configured so as to reflect light having wavelengths generally longer than that delineated by the characteristic or curve such as light having the wavelengths lying in the region 274 of the graph.

In the foregoing, the light being transmitted is the wanted light that is, for example to be sensed and amplified by the image intensifier tube 20. Alternatively, the color night vision system 10, 100 can be configured and arranged so that the light being reflected is the wanted light and the light being transmitted is the unwanted light. In this way, rejection filters can be used to form a complimentary set of long-wave pass filters and short-wave pass filters.

In further embodiments, the color night vision system 10, 100 further includes a noise mechanism or circuitry that adds noise to each of the two color informational channels as herein described.

Although a preferred embodiment of the invention has been described using specific terms, such description is for illustrative purposes only, and it is to be understood that changes and variations may be made without departing from the spirit or scope of the following claims.

What is claimed is:
1. An electro-optical viewing device, comprising:
   a light filtering system including a first light filter sub-system positioned at a light-input end of the device and a output sub-system distinct from the first light filter sub-system and positioned at a light-output end of the device,
   wherein each of the first filter sub-system and the output sub-system are configured and arranged so as to form two light channels each light channel having a transmis- sion characteristic defining the boundaries of the light channel with respect to wavelength;

wherein the first filter sub-system is further configured and arranged so the transmission characteristics that define the two light channels of the first filter sub-system, cross each other at a predetermined point, where the predetermined point at which the transmission characteristics for the two light channels cross each other lies in a range of wavelengths from about 580 nm to about 620 nm; and wherein each of the first filter sub-system and the output sub-system are configured and arranged so as to form only two light channels.

2. The device of claim 1, wherein the device provides a sensation of a full color output to a viewer.

3. The device of claim 2, wherein the predetermined point at which the transmission characteristics for the two light channels of the first filter sub-system cross each other is at a predetermined point with respect to a cut-off for each respective transmission characteristic.

4. The device of claim 3, wherein the transmission characteristics for the two light channels each have a sloping edge that approaches the cut-off for each respective transmission characteristic and wherein the predetermined point at which the transmission characteristics of the two light channels cross each other is a point along the sloping edge of the respective light channel.

5. The device of claim 3, wherein the predetermined point at which the transmission characteristics for the two light channels of the first filtering sub-system cross each other is one of about a $\leq 50\%$ or a 10% cut-off point for each respective transmission characteristic.

6. The device of claim 1 wherein the output sub-system comprises a second filter sub-system.

7. The device of claim 1 wherein the output sub-system comprises a display device.

8. The device of claim 1, wherein each of the first filtering sub-system and the output sub-system are configured and arranged so as to filter light into respective light channels using one of absorption, reflection or filtering techniques.

9. The device of claim 1, wherein the predetermined point at which the characteristics for the two light channels cross each other lies in another range of wavelengths from about 580 nm to about 600 nm.

10. The device of claim 1, wherein the predetermined point at which the transmission characteristics for the two light channels cross each other is at a wavelength of about 600 nm.

11. The device of claim 1, wherein one of the first light filtering sub-system and the output sub-system further includes two filters so as to form the two channels, where the two filters are one of electrically operated filter or filters that are oscillated or rotated.

12. The device of claim 11, wherein the predetermined point at which the transmission characteristics for the two light channels for each of the first light filtering subsystem and the output sub-system cross is at or about a wavelength selected from the group consisting of
(a) in the range of from about 580 nm to 600 nm, or
(b) about 600 nm.

13. The device of claim 11, wherein the first and output filter sub-systems are each rotated at a speed whereby successive switching between each of the plurality of filters comprising each filter sub-system occurs faster than about 15 times per second.

14. The device of claim 1, wherein the first light filtering sub-system further includes two filters that are being oscillated or rotated, and wherein excluding portions of the characteristics that are overlapping, one of the filters is a long-wave pass filter and the other of the filters is a short-wave pass filter.

15. The device of claim 1, wherein the device comprises a night vision device.

16. The device of claim 1, wherein the device has a substantially monochromatic output in the absence of the filtering system.

17. The electro-optical viewing device of claim 1, wherein the predetermined point at which the transmission characteristics for the two light channels of the first filter light sub-system cross each other lies in a range of wavelengths from about 590 nm to about 610 nm.

18. A night vision system comprising:
an electro-optical viewing device;
a light filtering system including a first light filter sub-system positioned at a light-input end of the electro-optical viewing device and a second light filter sub-system that is distinct from the first light filter sub-system and is positioned at a light-output end of the electro-optical viewing device,
wherein each of the first filter sub-system and the second filter sub-system are configured and arranged so as to include two light channels each light channel having a transmission characteristic defining the boundaries of the light channel;
wherein the first filter sub-system is further configured and arranged so the transmission characteristics that define the two light channels of the first filter sub-system cross each other at a predetermined point, the predetermined point at which the transmission characteristics cross each other is at or about a wavelength that is selected from the group consisting of:
(a) in the range of from about 580 nm to about 620 nm,
(b) in the range of from about 590 nm to 610 nm, or
(c) about 600 nm; and
wherein each of the first filter sub-system and the second filter sub-system are configured and arranged so each defines only two light channels.

19. The night vision system of claim 18, wherein the predetermined point at which the transmission characteristics for the two light channels cross each other is at one of about a $\leq 50\%$ or 10% cut-off point for each transmission respective characteristic of the two light channels.

20. A method for providing color images from an electro-optical device in which the image data from the electro-optical device contains brightness information of an area being viewed by the device without separate color information, said method for providing color images, comprising the steps of:
operably coupling an optical channel system to the electro-optical device;
configuring the optical channel system and arranging the optical channel system with respect to the electro-optical device so two color informational channels are provided to the viewer,
wherein a boundary is set between the two color informational channels, where the boundary is in a predetermined range of wavelengths of radiation such that the two informational channels formed by said configuring and arranging of the optical channel system are such that the viewer sees a color image;
wherein the boundary is set so as to satisfy the following relationship:

$$580 \leq \lambda_b \leq 620 \text{ nm}$$

where $\lambda_b$ is the wavelength of the radiation corresponding to the boundary between the two color informational channels; and wherein the optical channel system is configured so only two color informational channels are being provided.

21. The method for providing color images of claim 20, wherein the boundary is set so as to satisfy one of the following relationships:

$$580 \leq \lambda_b \leq 610 \text{ nm} \quad (a)$$

$$590 \leq \lambda_b \leq 610 \text{ nm} \quad (b)$$

where $\lambda_b$ is the wavelength of the radiation corresponding to the boundary between the two color informational channels.

22. The method for providing color images of claim 20, wherein each color informational channel is characterizable by a transmission characteristic having a cutoff point, and wherein said configuring includes configuring the optical channel system so the boundary between the two color informational channels corresponds to one of a ≦50% or a 10% cut-off point for each respective transmission characteristic.

23. The method for providing color images of claim 22, wherein the boundary established at the one of ≦50% or 10% cut-off point of the respective transmission characteristics is set so as to satisfy one of the following relationships:

$$580 \leq \lambda_b \leq 610 \text{ nm} \quad (a)$$

or $$590 \leq \lambda_b \leq 610 \text{ nm} \quad (b)$$

where $\lambda_b$ is the wavelength of the radiation corresponding to the boundary between the two color informational channels.

24. The method for providing color images of claim 22, wherein the boundary established at the one of ≦50% or 10% cut-off point of the respective transmission characteristics is set so $\lambda_b$ is about 600 nm, where $\lambda_b$ is the wavelength of the radiation corresponding to the boundary between the two color informational channels.

25. A method for providing color images from an electro-optical device in which the image data from the electro-optical device contains brightness information of an area being viewed by the device without separate color information, said method for providing color images, comprising the steps of:
operably coupling an optical channel system to the electro-optical device;
configuring the optical channel system and arranging the optical channel system with respect to the electro-optical device so two color informational channels are provided to the viewer,
wherein a boundary is set between the two color informational channels, where the boundary is in a predetermined range of wavelengths of radiation such that the two informational channels formed by said configuring and arranging of the optical channel system are such that the viewer sees a color image;
wherein the boundary is set so as to satisfy the following relationship:

$$580 \leq \lambda_b \leq 620 \text{ nm}$$

where $\lambda_b$ is the wavelength of the radiation corresponding to the boundary between the two color informational channels; and
adding an amount of noise in each of the two color informational channels.

26. The method of providing color images of claim 25, wherein the noise being added in one of random or gaussian.

27. A thermal vision system comprising:
an electro-optical viewing sub-system including sensors that generate outputs in two spectral ranges;
a display device operably coupled to the electro-optical viewing sub-system and including control circuitry so that the display provides alternating displays of the outputs in the two spectral regions;
a filter system positioned so as to be disposed between the display surface and an observer, the filter system having a plurality filter segments, and a mechanism that successively passes each of the plurality of filter segments past the display surface such that the display of outputs for one of the spectral regions is viewed through one of the filter segments of the plurality of filter segments and the display of outputs for the other of the spectral regions is viewed through the other filter segment of the plurality;
wherein a transmission characteristic for said one of the plurality of filter segments is established so as to display light having a wavelength that is less than a specific wavelength that lies in the range of from about 580 nm to about 620 nm and wherein a transmission characteristic for said other of the plurality of filter segments is established so as to display light having a wavelength that is greater than said specific wavelength; and
wherein only two color informational channels are provided.

28. The thermal vision system of claim 27, wherein the electro-optical viewing sub-system includes two thermal electro-optical devices each being characterized as sensing a different spectral range.

29. The thermal vision system of claim 27, wherein the electro-optical viewing sub-system includes two thermal sensors each being characterized as sensing a different spectral range and a beam splitter that is arranged so as to split coming light from scene being observed into beams and directing each of the beams to one of the two thermal sensors.

30. A thermal vision system comprising:
an electro-optical viewing sub-system including sensors that generate outputs in two spectral ranges;
a display device operably coupled to the electro-optical viewing sub-system and including control circuitry so that the outputs in the two spectral regions from the electro-optical viewing sub-system are displayed in an interleaved manner;
wherein the display is composed of two different color elements that are established so as to establish two light channels each light channel having a characteristic defining the boundaries of the color elements for the respective light channel;
wherein the color elements are established so one of the two light channel includes light having a wavelength that is less than a specific wavelength that lies in the range of from about 580 nm to about 620 nm and wherein the other of the two light channels includes light having a wavelength that is greater than said specific wavelength; and
wherein the electro-optical viewing sub-system and the display device are configures so only two light channels are provided.

31. The thermal vision system of claim 30, wherein the electro-optical viewing sub-system includes two thermal electro-optical devices each being characterized as sensing a different spectral range.

32. The thermal vision system of claim 30, wherein the electro-optical viewing sub-system includes two thermal sensors each being characterized as sensing a different spectral range and a beam splitter that is arranged so as to split coming light from scene being observed into beams and directing each of the beams to one of the two thermal sensors.

33. A vision system comprising:

an electro-optical viewing sub-system including two electro-optical devices each for sensing radiation in different spectral ranges and different spectral regions, each electro-optical device generating an output for its respective spectral range;

a display device operably coupled to the electro-optical viewing sub-system and including control circuitry so that outputs in the different spectral ranges are displayed in an interleaved manner;

wherein the display is composed of two different color elements that are established so as to establish two light channels each light channel having a characteristic defining the boundaries of the light channel, the color elements being established so one of the two light channel includes light having a wavelength that is less than a specific wavelength that lies in the range of from about 580 nm to about 620 nm and wherein the other of the two light channels includes light having a wavelength that is greater than said specific wavelength; and wherein each of the electro-optical viewing sub-system and the display device are configured and arranged so as to form only two light channels.

34. A vision system comprising:

an electro-optical viewing sub-system including two electro-optical devices each for sensing radiation in different spectral ranges and different spectral regions, each electro-optical device generating an output for its respective spectral range;

a display device operably coupled to the electro-optical viewing sub-system and including control circuitry so that outputs in the different spectral ranges are displayed in an interleaved manner;

wherein the display is composed of two different color elements that are established so as to establish two light channels each light channel having a characteristic defining the boundaries of the light channel, the color elements being established so one of the two light channel includes light having a wavelength that is less than a specific wavelength that lies in the range of from about 580 nm to about 620 nm and wherein the other of the two light channels includes light having a wavelength that is greater than said specific wavelength; and wherein one of two electro-optical devices views radiation in a thermal spectral region and the other of the two electro-optical devices is a night vision device.

35. An electro-optical viewing device, comprising:

a light filtering system including a first light filter sub-system positioned at a light-input end of the device and a output sub-system distinct from the first light filter sub-system and positioned at a light-output end of the device, wherein each of the first filter sub-system and the output sub-system are configured and arranged so as to form only two light channels each light channel having a transmission characteristic defining the boundaries of the light channel with respect to wavelength; and wherein the first filter sub-system is further configured and arranged so the transmission characteristics that define the two light channels of the first filter sub-system, cross each other at a predetermined point, where the predetermined point at which the transmission characteristics for the two light channels cross each other lies in a range of wavelengths from about 580 nm to about 620 nm; and wherein the predetermined point is established so that a predetermined portion of the transmission characteristics that define the two light channels overlap about the predetermined point so that each respective light channel also is sensitive to light in the overlapping portion of the other light channel.

\* \* \* \* \*